No. 837,124. PATENTED NOV. 27, 1906.
T. R. RINGWOOD.
DUMP WAGON.
APPLICATION FILED AUG. 21, 1905.
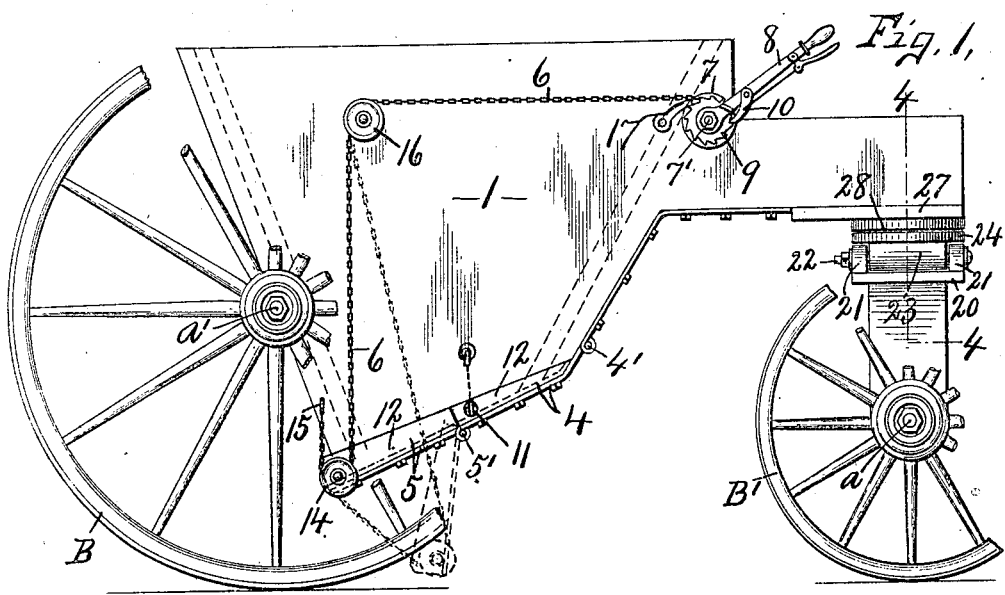
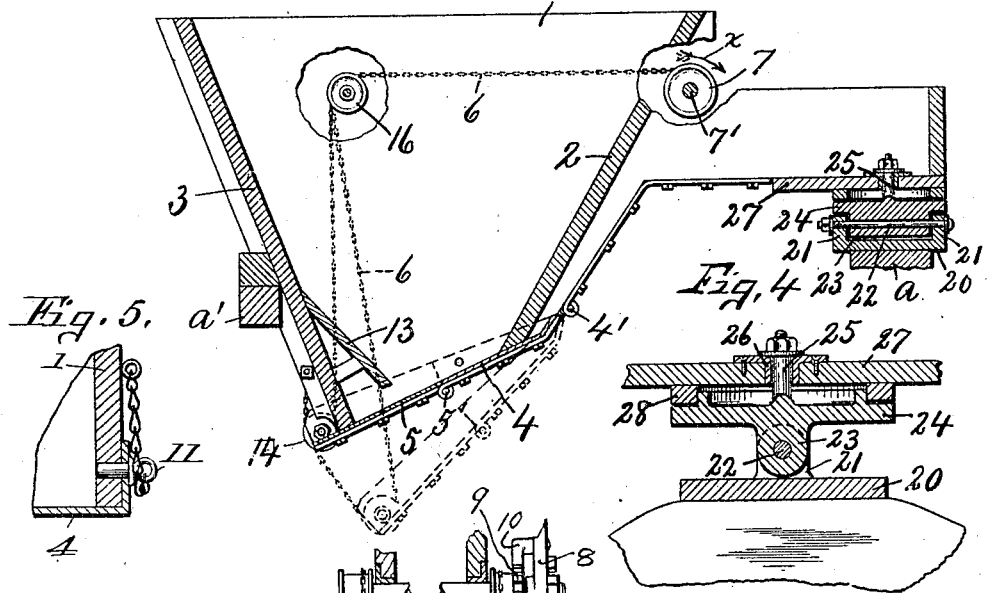
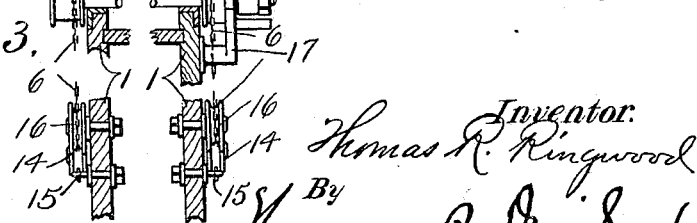
Witnesses:
J.E. Arthur;
B. E. Robinson.
Inventor:
Thomas R. Ringwood
By Howard P. Denison
Attorney.

UNITED STATES PATENT OFFICE.

THOMAS R. RINGWOOD, OF AUBURN, NEW YORK.

DUMP-WAGON.

No. 837,124.  Specification of Letters Patent.  Patented Nov. 27, 1906.

Application filed August 21, 1905. Serial No. 275,067.

*To all whom it may concern:*

Be it known that I, THOMAS R. RINGWOOD, of Auburn, in the county of Cayuga, in the State of New York, have invented new and useful Improvements in Dump-Wagons, of which the following, taken in connection with the accompanying drawings, is a full, clear, and exact description.

This invention relates to improvements in dump-wagons having forwardly-swinging bottom doors controlled by the operator and adapted to dump the load at the rear end and beneath the rear axle or between the wheels.

This wagon is especially adapted for distributing the load in small quantities while the wagon is in motion—as, for instance, in making road-beds, grading, and similar work—but is equally useful in dumping or discharging the complete load at once.

The essential object, therefore, is to provide the dump-box with bottom doors arranged in an inclined plane one in advance of the other and inclining downwardly and rearwardly from its front end, which is hinged to the main body, while the rear door-section is hinged to the rear edge and is operable independently of the front section.

A further object is to provide an interior guard-plate or shield inclining downwardly and forwardly from the rear end of the box to a point in close proximity to the door, but at the rear of the meeting edges of the door-sections, so as to throw the load forwardly as much as possible to relieve the strain upon the rear edge of the rear door-section, which incidentally relieves in a measure the strain upon the operating-cable.

A still further object is to pivot the front axle centrally upon a horizontally-rotatable fifth-wheel section, which in turn is journaled in a cross-bar on the under side of the front end of the box, whereby the front axle is capable of horizontal and vertical rocking movements to relieve the strain upon the fifth-wheel and its king-bolt.

Other objects and uses will appear in the following description.

In the drawings, Figure 1 is a side elevation of my improved dump-wagon, portions of the front and rear wheels being broken away. Fig. 2 is a longitudinal vertical sectional view through the box and fifth-wheel. Fig. 3 is a top plan, partly broken away, of the winding mechanism for controlling the action of the doors. Fig. 4 is a sectional view, enlarged, taken on line 4 4, Fig. 1. Fig. 5 is a sectional view through one side of the box, showing the locking-bolt.

The dump-box consists, essentially, of opposite substantially parallel sides 1, front and rear ends 2 and 3, and swinging bottom door-sections 4 and 5, the operation of which is controlled by suitable cables 6 and a winding-drum 7 through the medium of a hand-lever 8 and ratchet and pawl 9 and 10.

The box proper is located almost wholly between the front and rear axles, as $a$ and $a'$, and between the rear wheels, as B, and the front end 2 is a sufficient distance at the rear of the front wheels, as B′, to permit the latter to turn freely under the bottom of the front extension of the sides 1 without liability of striking said front end or in any way interfering with the free action of the swinging bottom doors, it being understood that the extensions of the sides in front of the box proper are materially reduced in width and a considerable distance above the wheels to allow the latter to turn freely thereunder.

The box proper gradually increases in depth from front to rear, the top being disposed in a substantially horizontal plane, and the ends 2 and 3 converge downwardly, thereby forming a kind of hopper having an opening in its bottom and its rear end extending downwardly some distance below the horizontal plane of the lower end of the front end.

The front bottom door-section 4 is hinged at its front end at 4′ to suitable straps which are secured to the lower edges of the sides of the box a slight distance in front of the front end 2, so as to permit the doors to swing clear of the opening in the bottom of the box when both sections are allowed to open together, as seen in Fig. 2. This affords a free and unobstructed passage for the load when the bottom doors are released, for the reason that the doors swing downwardly and forwardly to a substantially vertical position in front of the discharge-opening, while the front end inclines downwardly and rearwardly, and therefore throws the load at the rear of the doors. One advantage of this forward swinging movement of the door is that it rides freely over any obstructions which its lower edge may encounter in leaving the dump.

The doors 4 and 5 are of substantially equal width from front to rear, being divided transversely at about the center of the discharge-opening, the rear section being hinged at its front edge at 5' to the rear edge of the front section 4, and is therefore adapted to swing downwardly and forwardly independently of the front section. This arrangement of the doors is found to be very convenient and practical in road-making or in distributing the load evenly as the wagon is drawn forward, and in order that this may be successfully accomplished I provide means, in this instance a bolt or pin 11, for holding the door-section 4 closed while using the rear section alone, said pin or draw-bolt being passed through an upturned flange 12, with which both door-sections are provided, and into a suitable aperture in the adjacent side of the box, whereby the front door-section is held in its closed position and the rear door-section is free to swing downwardly and forwardly, as shown in Fig. 1.

The flanges 12 lap upon the sides of the box and are preferably integral with the doors, which are in this instance formed of sheet metal or boiler-iron, said flanges increasing in depth from the front end to the rear end of the box, so as to form a chute for confining the material within the width of the doors when being discharged from the box between the wheels.

The rear end of the box is provided with a guard plate or shield 13, inclining downwardly and forwardly from said rear end and terminating near the inner face of the bottom door-section 5, but at the rear of the meeting edges of the doors. The object of this is to relieve in a measure the pressure of the load at the junction of the door-section 5 with the lower edge of the rear end 3 of the box, so as to avoid as far as possible undue strains upon the cable 6, and thereby avoid opening of the joint and leakage of the material from the box.

The free edge of the rear door-section 5 is provided with a pair of idlers or rollers 14, located at opposite sides of the box, forming bearings for the rear lower ends of the cables 6, which are rigidly attached to suitable anchor bolts or eyes 15 on the sides of the box in a plane above the door, such cables being passed around the idlers 14 and upwardly over additional idlers 16 and then forwardly over a drum 7, to which the front ends of the cables are anchored. The idlers 16 are journaled on opposite sides of the box a considerable distance above the bottom and nearly directly over the idlers 14 when the doors are closed, thereby affording a sufficient length of chain between the idlers 14 and 16 to allow the doors to swing to their open position with as little resistance as possible.

I preferably provide two of the drums 7, one for each of the cables 6, both of which are mounted upon and secured to a revoluble shaft 7', the latter being journaled in suitable bearings in the sides of the box and in front of the front end 2, so that by rotating the shaft in the direction indicated by arrow X both doors are drawn to their closed position and open by gravity when the shaft and drums 7' and 7 are released.

The action of the doors is controlled by the lever 8, ratchet 9, and pawl 10, the drums 7 and shaft 7' being normally held against retrograde movement by a suitable detent 17.

When the wagon is to be used for the gradual distribution of the load over a considerable area, as in road-making, the front bottom door-section is locked in its closed position by means of the pins or draw-bolts 11, leaving the rear section free to swing as controlled by the lever 8 and detent 17. The release of the detent from holding engagement with the ratchet-wheel 9 allows the bottom section 12 to swing downwardly and forwardly by gravity or by the pressure of the load thereon to the position shown by dotted lines in Fig. 1 or to any intermediate position as controlled by the operator through the medium of the lever 8 and connecting-cables 6. These draw-bolts or locking-pins 11, of which there are preferably two, one at each side of the box, may be moved into and out of operative position by mechanical or manual means, preferably by the latter, and by withdrawing them it is evident that the doors will operate in the manner previously described—that is, they will both swing together upon the pivotal bolt or pin 4', as indicated by dotted lines in Fig. 2, although these dotted lines indicate an intermediate position, while the door actually swings when released to a vertical position in front of the discharge-opening.

It will be observed that the deflector-plate 13 deflects the lower portion of the load forwardly from the free edge of the swinging door-section 5 and reduces the size of the opening through which the material may be discharged when the front door-section 4 is closed. This is particularly advantageous in the distribution of comparatively dry material—such as finely-broken stone, gravel, and similar road-bed material—because the pressure of the load being near the pivot 5' is comparatively light, which enables the operator to control the opening of the door-section 5 to any desired degree.

The fifth-wheel construction previously mentioned consists, esesntially, of an axle-plate 20, having upwardly-projecting ears 21, between which is pivoted at 22 a depending lug 23 of a fifth-wheel plate 24, the pivot 22 running transversely of the front axle or in the direction of line of draft to permit the axle to rock vertically. The fifth-wheel section 24 is preferably circular in top plan and is provided with a central upwardly-projecting pivotal bolt or stud 25, which is journaled in a sleeve 26 on a cross-bar 27, by which the front ends of the side extensions are tied together. An annular ring or metal-bearing surface 28, forming the other part of the fifth-wheel section, is secured to the lower face of the cross-bar 27 and rests upon the plate 24 to permit the front axle to be turned horizontally.

The operation of my invention will now be readily understood by reference to the foregoing description and accompanying drawings, and it will be seen that the essential features of the invention consist in the hopper-like box having downwardly-converging front and rear ends and the rearwardly and downwardly inclined bottom door-sections 4 and 5 discharging under the rear axle, together with a pair of cables, as 6, located at opposite sides of the box and connected to the free ends of the door-section 5, and in addition to this the deflecting-plate 13 and the specific construction of the fifth-wheel.

What I claim is—

1. In a dump-wagon, a box having forwardly and downwardly swinging bottom doors hinged to each other, the front door being hinged to the box-frame, a drum and means for rotating it, and separate cables having their front ends attached to the drum and their rear ends passed under idlers on the rear door and anchored to the box.

2. In a dump-wagon, a dump-box having downwardly and forwardly swinging bottom doors hinged to each other, one of the doors being hinged to the frame of the box, and means for controlling the action of said doors.

3. In a dump-wagon, a box having downwardly and forwardly swinging bottom doors hinged to each other, one of the doors being hinged to the frame or box, and means for locking one of the doors to the box permitting the other door to swing separately, and means to control the action of said other door.

4. In a dump-wagon, a box having downwardly-converging front and rear ends and a forwardly-swinging bottom door, in combination with a guard-plate in the box and inclining downwardly and forwardly from its rear ends.

5. In a dump-wagon, a dump-box having downwardly and rearwardly inclined bottom doors hinged to each other, the front door being hinged to the box, means for locking the front door in its closed position, sheaves or idlers on the rear door, a rotary drum and actuating means therefor, and separate cables attached to the drum at opposite sides of the box and having their rear ends rendering over their respective sheaves and anchored to the box.

6. In a dump-wagon, a dump-box having downwardly-converging front and rear ends and bottom doors hinged to each other and inclining downwardly and rearwardly from their front edges, the front door being hinged to the box, a guard-plate inclining downwardly and forwardly from the rear end within the box, a rotary drum, separate cables having their front ends attached to the drum and extending rearwardly and downwardly therefrom and having their rear ends anchored to the box, and idlers on the rear door resting upon said cables.

In witness whereof I have hereunto set my hand this 15th day of August, 1905.

THOMAS R. RINGWOOD.

Witnesses:
 B. LOUISE LAIRD,
 LOUIS K. R. LAIRD.